UNITED STATES PATENT OFFICE.

CHARLES W. MERRILL, OF ALAMEDA, CALIFORNIA.

PRECIPITANT FOR RECOVERING METALS FROM SOLUTIONS.

SPECIFICATION forming part of Letters Patent No. 684,578, dated October 15, 1901.

Application filed February 7, 1900. Serial No. 4,303. (No specimens.)

*To all whom it may concern:*

Be it known that I, CHARLES W. MERRILL, a citizen of the United States, residing at Alameda, county of Alameda, State of California, have invented an Improvement in Precipitants for Recovering Metals from Solutions; and I hereby declare the following to be a full, clear, and exact description of the same.

The precipitant consists of a mixture of zinc and a gritty substance not detrimental to the cyanid solution—such as silica, emery, corundum, or the like—mechanically pulverized to that state of subdivision which is most desirable from an economic and technical standpoint for the particular solution from the particular ore in any specific case of cyanid lixiviation. Owing to the malleability of zinc it has hitherto been found difficult and expensive to mechanically pulverize it to a very fine state of comminution, because the zinc particles would flatten out and fill up the depressions in the grinding-surfaces, thus rendering them very ineffective or entirely useless. I find by mixing a gritty material with the zinc it can be pulverized with great facility and economy to any degree of fineness required.

The ability to regulate the fineness of the zinc powder in precipitating cyanid solutions by agitation and subsequent filtration or decantation is of very great advantage, because by so doing the minimum amount of cyanid is taken up or decomposed by the zinc. Other things being equal, the weaker the cyanid solution the finer the zinc powder must be, and it is obvious that to use a very fine powder, such as zinc fume, with a comparatively strong solution of cyanid, such as 0.2 of one per cent. and higher, insures a considerable waste of cyanid. Furthermore, the contents of the solutions themselves bear an important relation to the precipitation. For instance, where silver, lead, or mercury are dissolved from ore or tailings by the cyanid solution in considerable quantities relative to the gold the precipitation is materially facilitated by the couples formed between these metals and the zinc, and in such cases the loss of cyanid from using unduly fine zinc powder is material. Furthermore, in the receptacle for the precipitate, whether this be a vat, filter-press, or cone, it is absolutely essential that an excess of zinc be maintained, and for the purposes of filtration or decantation, as well as for the economy pointed out above, it is essential that the zinc be not too fine. Furthermore, in addition to the above advantages as compared with zinc fume, which is a mixture of zinc finely divided by distillation, zinc oxid, &c., my mechanically-pulverized zinc is an improvement, because it contains no zinc oxid and is much freer from impurities which unite and consume considerable amounts of the cyanid to no useful purpose. Thus zinc fume contains from five per cent. to forty per cent. of zinc oxid, all of which is in a very fine state of division, and consequently very active toward cyanid, which is decomposed without resultant precipitation of precious metals by this oxid.

As compared with zinc threads or filaments used as precipitating-filters zinc powder possesses the advantages of a greater surface per unit of material and, combined with agitation, the further advantages of a more perfect contact with the solution.

In the event of the presence of deterrent metals or suspended material in the solutions which coat said zinc threads or filaments, thus decreasing the surface exposed for subsequent precipitation, the zinc powder has the advantage of exposing a clean surface when added to each tank of solution.

The material herein described, consisting of a mixture of zinc with a gritty inert substance, as silica, emery, corundum, &c., has a further advantage as compared with zinc fume or zinc filaments in that the gritty material acts as a filler or dilatant, thus exposing a greater surface to the solution per unit of zinc used than is exposed by any other zinc product now used for a similar purpose.

Having thus described my invention, what I claim as new, and desire to secure by Letters Patent, is—

1. A precipitant for recovering precious metals from cyanid solutions which consists of a combination of zinc and a gritty inert non-metallic material in a finely-divided condition.

2. The combination with a metal capable of precipitating other metals from cyanid solutions, of a gritty inert non-metallic material to increase the surface exposed per unit of weight of the precipitating metals.

In witness whereof I have hereunto set my hand.

CHARLES W. MERRILL.

Witnesses:
S. H. NOURSE,
JESSIE C. BRODIE.